US012792925B1

(12) United States Patent
Aharon et al.

(10) Patent No.: US 12,792,925 B1
(45) Date of Patent: Nov. 10, 2026

(54) REINFORCEMENT LEARNING BASED EXPERT ROUTING FOR MIXTURE OF EXPERTS LANGUAGE MODELS

(71) Applicant: INTUIT INC., Mountain View, CA (US)

(72) Inventors: Kfir Aharon, Tel Aviv (IL); Ofir Ben Shoham, Tel Aviv (IL); Matan Vetzler, Tel Aviv (IL); Lior Vassertail Azroel, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/315,387

(22) Filed: Aug. 29, 2025

(51) Int. Cl.
*G06N 3/092* (2023.01)
*G06N 3/047* (2023.01)

(52) U.S. Cl.
CPC ............ *G06N 3/092* (2023.01); *G06N 3/047* (2023.01)

(58) Field of Classification Search
CPC .............................. G06N 3/092; G06N 3/047
See application file for complete search history.

(56) References Cited

U.S. PATENT DOCUMENTS

2022/0253680 A1* 8/2022 Zhao ...................... G06N 3/045
2025/0299059 A1* 9/2025 Ahmed .................. G06N 3/045

OTHER PUBLICATIONS

Clark et al., "Unified Scaling Laws for Routed Language Models", Feb. 9, 2022, arXiv:2202.01169v2, pp. 1-31. (Year: 2022).*
Wu et al., "Mixture-of-Experts Meets In-Context Reinforcement Learning", Jun. 5, 2025, arXiv:2506.05426v1, pp. 1-27. (Year: 2025).*
Bengio et al., "Conditional Computation in Neural Networks for Faster Models", Jan. 7, 2016, arXiv:1511.06297v2, pp. 1-12. (Year: 2016).*

* cited by examiner

*Primary Examiner* — Brent Johnston Hoover
(74) *Attorney, Agent, or Firm* — DLA PIPER LLP US

(57) ABSTRACT

Embodiments disclosed herein may use reinforcement learning techniques to train a gating network and optimize routing policy. Reinforcement learning may allow for an immediate reward (or penalty as the case may be) such that the desired actions can be rewarded and undesired actions can be penalized. The routing policy optimized using reinforcement learning may move away from the inflexible approach of the conventional gating networks and offer a desired level of flexibility for any type of query. Additionally, the gating network may be continuously trained upon deployment.

18 Claims, 4 Drawing Sheets

200

200

300

REINFORCEMENT LEARNING BASED EXPERT ROUTING FOR MIXTURE OF EXPERTS LANGUAGE MODELS

BACKGROUND

A mixture of experts language model is a type of neural network architecture that divides a neural network model into multiple specialized subnetworks called "experts," each expert focusing on different parts or aspects of the input data. A separate component, known as the gating network or router, determines which expert(s) should process a given input and combines their outputs to produce the final result. That is, in the context of mixture of experts language models, these models will have to necessarily rely on the gating network (or the router) to select the appropriate subset of experts for each input token.

Conventional gating networks, however, have several technical shortcomings. For instance, conventional gating networks typically use a softmax based top-k selection trained via backpropagation. This usage exhibits several technical limitations. One technical limitation is poor generalization: the gating networks tend to memorize patterns and specific experts within specific domains they frequently encounter. As a result, when queries fall outside these domains, the gating network struggles to generalize and often routes poorly, degrading performance.

Another technical limitation is inflexible routing. Conventional gating networks make discrete routing decisions that are not directly optimized for task-level performance and fail to adapt dynamically in non-stationary or evolving environments. Another technical limitation is underutilization and poor specialization of the experts. Some experts may be become overused while others are underutilized, reducing the mixture of expert language model's efficiency and specialization potential. Yet another technical limitation is reward insensitivity. Current gating networks cannot incorporate complex or delayed reward signals, making it difficult to optimizing routing behavior based on long term outcomes or user defined performance criterial.

As such, a significant improvement in gating networks for mixture of expert language models is therefore desired.

SUMMARY

Embodiments disclosed herein solve the aforementioned technical problems and may provide other solutions as well. The embodiments disclosed herein may use reinforcement learning techniques to train the gating network and optimize routing policy. Reinforcement learning may allow for an immediate reward (or penalty as the case may be) such that the desired actions can be rewarded and undesired actions can be penalized. The routing policy optimized using reinforcement learning may move away from the inflexible approach of the conventional gating networks and offer a desired level of flexibility for any type of query. Additionally, the gating network may be continuously trained upon deployment.

In one or more embodiments, a computer-implemented method for using a mixture of experts network to predict a next token for a large language model may be provided. The method may comprise receiving a token for which the next token is to be predicted by the mixture of experts network and selecting, by a gating network, a subset of experts in the mixture of experts network to process the token, the subset of experts having corresponding weights. The gating network may have been trained by inputting a training token to the gating network, selecting, by the gating network, one or more experts within the mixture of experts network for processing the training token, combining outputs from the one or more experts to generate a final output of the mixture of experts network, calculating a reward for the gating network using a difference between the final output and a corresponding correct output, and updating a policy gradient of a routing policy of the gating network based on the reward. The method may further comprise generating, by the subset of experts, corresponding intermediate outputs and predicting the next token based on the intermediate outputs and the corresponding weights.

In one or more embodiments, a system may be provided. The system may comprise a non-transitory storage medium storing computer program instructions and one or more processors configured to execute the computer program instructions to cause operations comprising receiving a token for which a next token is to be predicted by a mixture of experts network and selecting, by a gating network executed by the one or more processors, a subset of experts in the mixture of experts network to process the token, the subset of experts having corresponding weights. The gating network may have been trained by inputting a training token to the gating network, selecting, by the gating network, one or more experts within the mixture of experts network for processing the training token, combining outputs from the one or more experts to generate a final output of the mixture of experts network, calculating a reward for the gating network using a difference between the final output and a corresponding correct output, and updating a policy gradient of a routing policy of the gating network based on the reward. The operations may further comprise generating, by the subset of experts, corresponding intermediate outputs and predicting the next token based on the intermediate outputs and the corresponding weights.

It should be understood that the drawings are merely presented as examples and should not be considered limiting.

DETAILED DESCRIPTION OF SEVERAL EMBODIMENTS

Embodiments disclosed herein describe training and deploying a gating network (or a router) for a mixture of models network. The training, performed generally using reinforcement learning techniques, may impart a flexible routing policy such that the gating network may forward an input token to an appropriate subset of experts. This is a significant improvement upon the conventional gating networks that leverage a static approach causing routing to a wrong set of experts and not being able to handle new types of queries. The gating network trained using the embodiments herein can be continuously trained during deployment with positive rewards for a desired behavior and negative rewards for a non-desired behavior.

Figure 1:
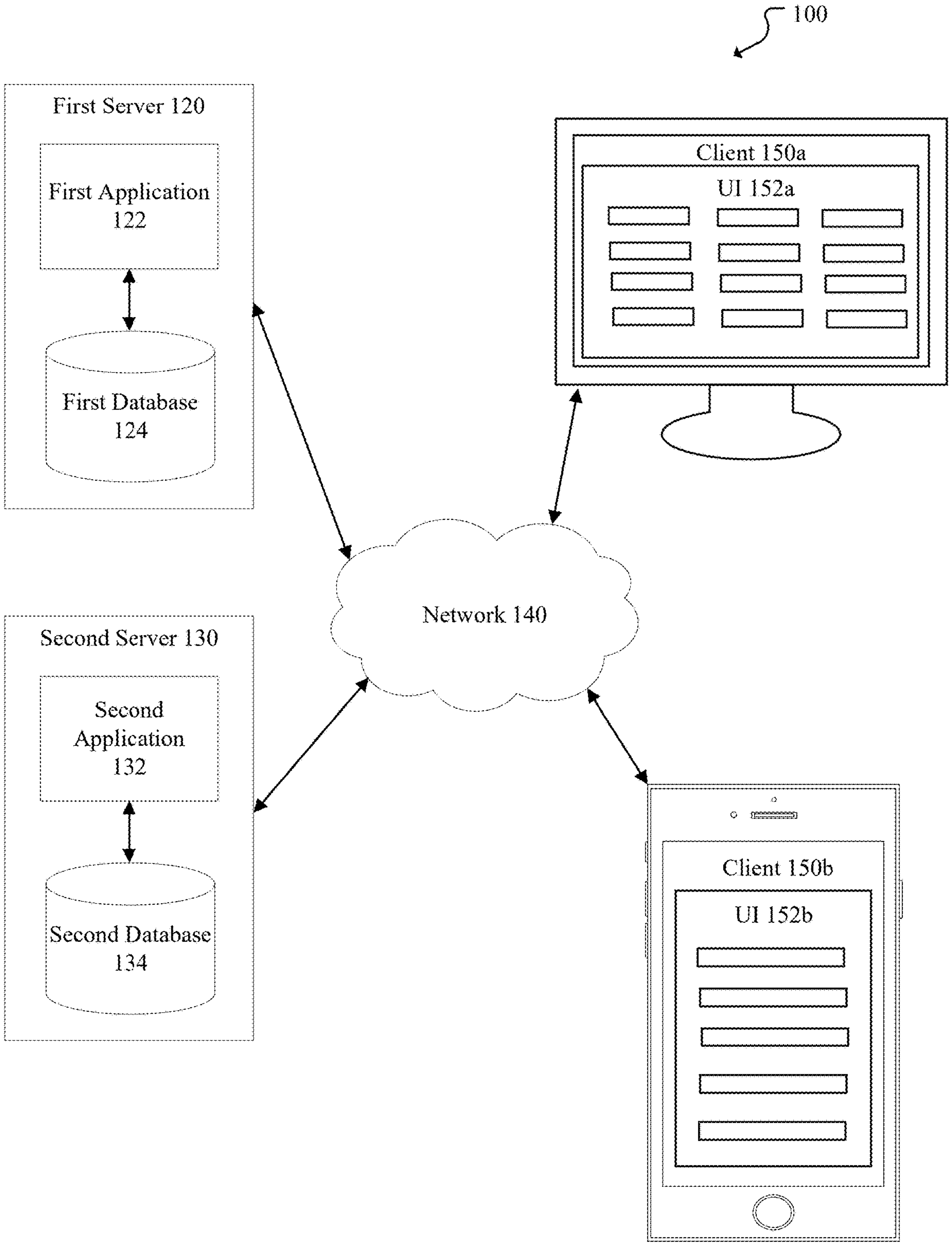
FIG. 1 shows an example of a system configured for training and deployment of a gating network, based on the principles disclosed herein.

FIG. 1 shows an example of a system 100 configured for training and deployment of a gating network, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150*a*, 150*b* (collectively referred to herein as "client devices 150"), and first and second servers 120, 130 interconnected by a network 140. The first server 120 hosts a first server application 122 and a first database 124 and the second server 130 hosts a second server application 132 and a second database 134. The client devices 150*a*, 150*b* have user interfaces 152*a*,152*b*, respectively, (collectively referred to herein as "user interfaces (UIs) 152"), which may be used to communicate with the server applications 122, 132 and using the network 140.

The server applications 122, 132 implement the various operations disclosed throughout this disclosure. For example, the server applications 122, 132 may train and deploy a gating network for the mixture of expert models, e.g., for large language models. The server applications 122, 132 may train the gating network using input tokens from the corresponding databases 124, 134 and through reinforcement learning techniques. The reinforcement learning techniques may cause the server applications 122, 132 to provide the gating network with a reward for a desired behavior and a penalty (negative reward) for an undesired behavior. Such training may ensure that the gating network—during deployment—may flexibly route a query (e.g., in form of an input token) to the correct set of experts. Additionally, the trained gating network may also handle new types of queries based on the reinforcement learning techniques. The server applications 122, 132 may further continuously train the gating network during deployment such that the gating networks continuously improves with usage.

Communication between the different components of the system 100 is facilitated by one or more application programming interfaces (APIs). APIs of system 100 may be proprietary and or may include such APIs as AWS APIs or the like. The network 140 may be the Internet and/or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present user interfaces (UIs) 152 and receive user inputs, e.g., user's instructions to train and/or deploy one or more gating networks. The UIs 152 are generally graphical user interfaces (GUIs). For example, a user may use the UIs 152 to instruct the system to train a gating network. Additionally, the user may use UIs 152 to deploy the trained gating network. UIs 152 may further be used by an admin user to perform programming and/or administrative functions within the system 100.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one) servers. In another example, a plurality of client devices 150 may communicate with first server 120 and or second server 130. A single user may have multiple client devices 150, and or there may be multiple users each having their own client devices 150.

Furthermore, it should be understood that the server applications 122, 132 running on the servers 120, 130, and the databases 124, 134 being hosted by the servers 120, 130 is just an example, and should not be considered limiting. Different portions of the server applications 122, 132 and, in one or more embodiments, the entirety of the server applications 122, 132 can be stored in the client devices 150. Similarly, different portions or even the entirety of the databases 124, 134 can be stored in the client devices 150. Therefore, the functionality described throughout this disclosure can be implemented at any portion of the system 100.

Figure 2:
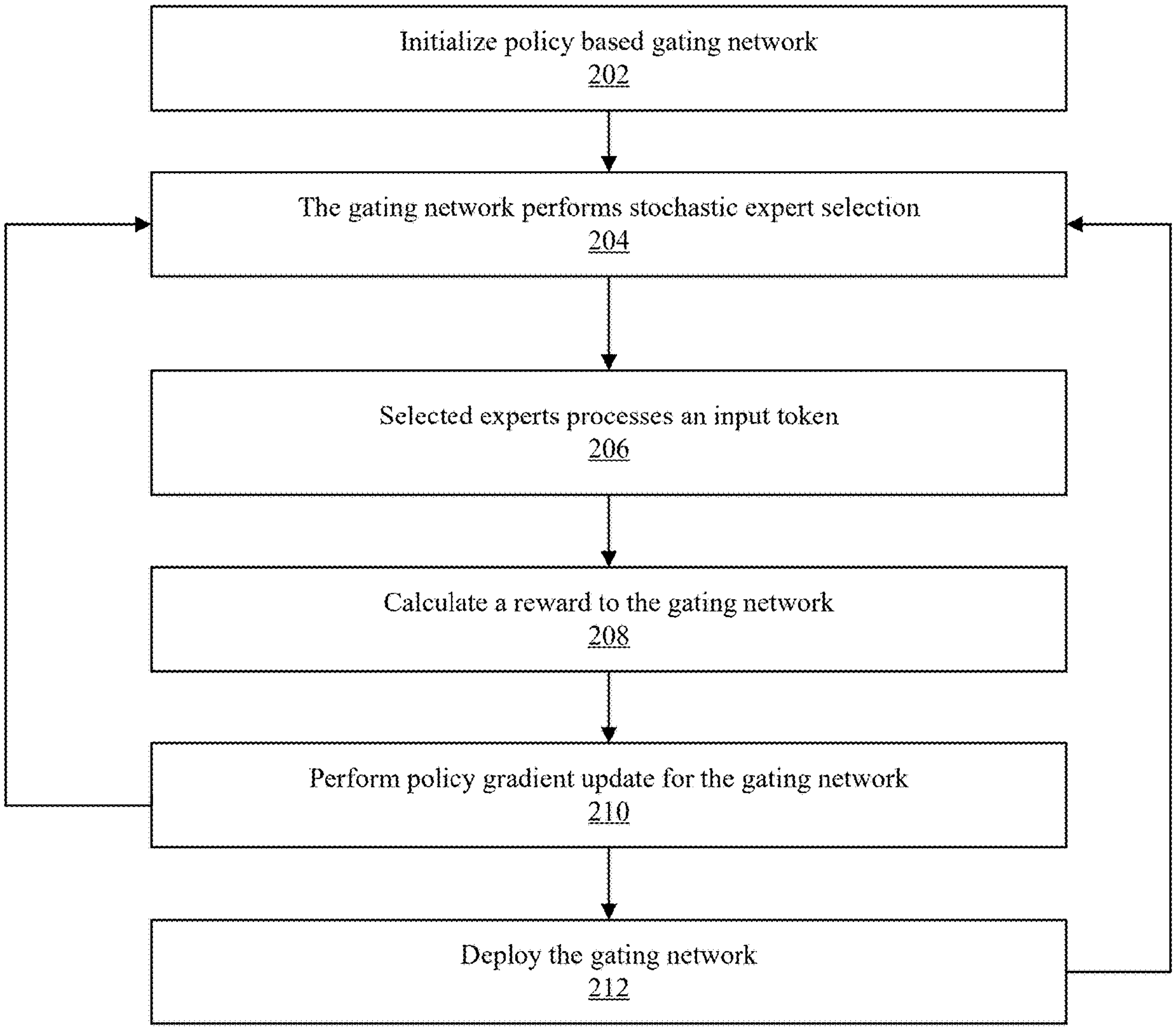
FIG. 2 shows a flow diagram of an example method of reinforcement learning based expert routing for mixture of expert language models, based on the principles disclosed herein.

FIG. 2 shows a flow diagram of an example method 200 of reinforcement learning based expert routing for mixture of expert language models, based on the principles disclosed herein. It should, however, be understood that the steps of the method 300 are provided as examples and should not be considered limiting. Therefore, methods with alternative, additional, or fewer number of steps should be considered within the scope of this disclosure. The steps of the method 300 may be performed by any combination of components of the system 100 shown in FIG. 1.

The method begins at step 202, where a policy based gating network may be initialized. In one or more embodiments, the policy based gating network may compute a probability of distribution over experts for each input token. That is, the policy based gating network may implement a policy of $\pi\theta(a|s)$, where s is the input token embedding, a is the expert selection, and $\pi\theta$ is the policy function.

At step 204, the gating network may perform a stochastic expert selection. The gating network may select a plurality of experts using the stochastic expert selection process. In one or more embodiments, the gating network may select experts based on sampling from the policy distribution. That is, the gating network may use a routing policy to generate a set of potential experts. Out of the set of potential experts, the gating network may sample a subset of experts to process an input token for the training. In one or more embodiments, the gating network may select the experts using a stochastic top-k mechanism, such as Gumbel-softmax or noisy gating, for exploration purposes. The stochastic top-k mechanism selects experts not deterministically from the highest-scoring candidates, but stochastically from the top-k most probable candidates, introducing controlled randomness to the expert selection.

At step 206, the selected experts may process the input token. Each of the selected expert may process the input token and the outputs may be combined. The final prediction may be formed by a weighted combination of the individual expert outputs, using the weights from the gating network. For the case of the mixture of experts being used by large language models, the final prediction may be the next word (i.e., token) in a sentence.

At step 208, a reward to the gating network may be calculated. The reward may function as a feedback to the gating network where the feedback may quantify a benefit for a desired action and a penalty for a non-desired action such that the gating network may be guided toward the desired behavior. Concretely, the reward may be use on a match (positive reward) or a mismatch (negative reward) between the generated prediction and the correct output. For instance, a loss may be calculated as a cross entropy between the final prediction and the desired prediction. The reward then may be a negative of the cross entropy.

At step 210, a policy gradient update may be performed for the gating network. The policy gradient update may update the gating network's parameters to increase the probability of actions that lead to higher rewards and decrease the probability of actions that lead to lower rewards. Generally, the policy gradient update by may be performed using reinforcement and/or similar algorithms using ∇θJ=E[r∇θ log πθ(a|s), which represents the gradient of the expected reward objective Jwith respect to the policy parameters e. Some example algorithms to implement the policy gradient update are described below. It should be noted that the implementational details of the algorithms are known in the art, and therefore will not be described in detail.

In one or more embodiments, a proximal policy optimization may be used. The proximal policy optimization may stabilize the training of the gating network using clipped surrogate objectives, which may limit how much the policy is allowed to change in a single update, thereby improving training stability and preventing destructive, overly large updates.

In one or more embodiments, advantage actor critic may be used. The advantage actor critic may implement an earned critic to estimate the advantage A(s,a)=r−V(s)A(s,a)=r−V(s)A(s,a)=r−V(s), reducing variance further. Here, A(s, a) is a standard advantage function that measures how much better it is to take a specific action a in a state s compared to the average or expected value of being in that state s following the current policy; (s) is the state-value function, the expected return following the current policy from state; and r is the immediate reward. Generally, advantage actor critic may combine both policy based and value based methods to train the gating network more efficiently and ably. Specifically, the actor may be a policy function (usually a neural network) that decides what action to take in a given state, and the critic may be a value function that may evaluate how good a particular state (or state-action pair) is by estimating the expected future rewards.

In one or more embodiments, trust region policy optimization may be used. The trust region policy optimization may maximize reward under a Kullback-Leibler (KL) divergence constraint to prevent large policy shifts between updates. That is, the optimization may allow updates when the KL divergence stays below a set threshold, preventing overly aggressive policy changes.

In one or more embodiments, soft actor critic may be used for continuous routing decisions. Soft actor critic may optimizes a maximum entropy objective and may be suitable when expert selection is parameterized as a soft, continuous vector.

In one or more embodiments, bandit approaches may be used for simpler token level routing decisions. The bandit approaches may use Thompson sampling or upper confidence bound (UCB) if the selection problem is simplified to stateless decision-making. Reward baselines may be used to reduce variance.

It should be noted that steps 204-210 may be repeated until the gating network is adequately trained. In each training loop, the experts may be updated via a standard backpropagation. The gating network may be updated via reinforcement learning in parallel, thereby forming a hybrid optimization sequence. An example pseudocode for training the gating network (referred to as router) is shown below.

---

Require: Mixture-of-Experts model with experts $\{E_1, E_2, \ldots, E_M\}$, router policy $\pi_\theta(a|s)$, learning rates $\alpha_\theta$, $\alpha_W$ Initialize router parameters $\theta$ and expert weights W
for each training batch (x, y) do
  Compute token embeddings $H = \{h_1, h_2, \ldots, h_T\}$ from input x
  for each token $h_j$ in H do
    Compute expert probabilities $p_j = \pi_\theta(a|h_j)$
    Sample expert $k_j \sim p_j$
    Get output $o_j = E_{k_j}(h_j)$
  end for
  Aggregate outputs $\{o_j\}$ to form prediction $\hat{y}$
  Compute loss $\mathcal{L}$ = CrossEntropy($\hat{y}$, y)
  Compute reward $r = -\mathcal{L}$
  Estimate baseline b (e.g., moving average of past rewards)
  Compute plicy gradient:

$$\nabla_\theta J = (r-b)\cdot\sum_{j=1}^{T}\nabla_\theta \log\pi_\theta(k_j|h_j)$$

Optionally add:
  Entropy bonus $H = -\sum_j \sum_e \pi_\theta(e|h_j)\log\pi_\theta(e|h_j)$
  Load balancing loss $L_{lb}$ from expert usage
  Update: $\nabla_\theta J \leftarrow \nabla_\theta J + \beta\nabla_\theta H - \lambda\nabla_\theta L_{lb}$
  Update router: $\theta \leftarrow \theta + \alpha_\theta \cdot \nabla_\theta J$
  Update experts via backpropagation: $W \leftarrow W - \alpha_W \cdot \nabla_W \mathcal{L}$
end for

---

At step 212, the gating network may be deployed. The gating network may continuously learn using steps 204-210 during the deployment based on the corresponding predictions.

Figure 3:
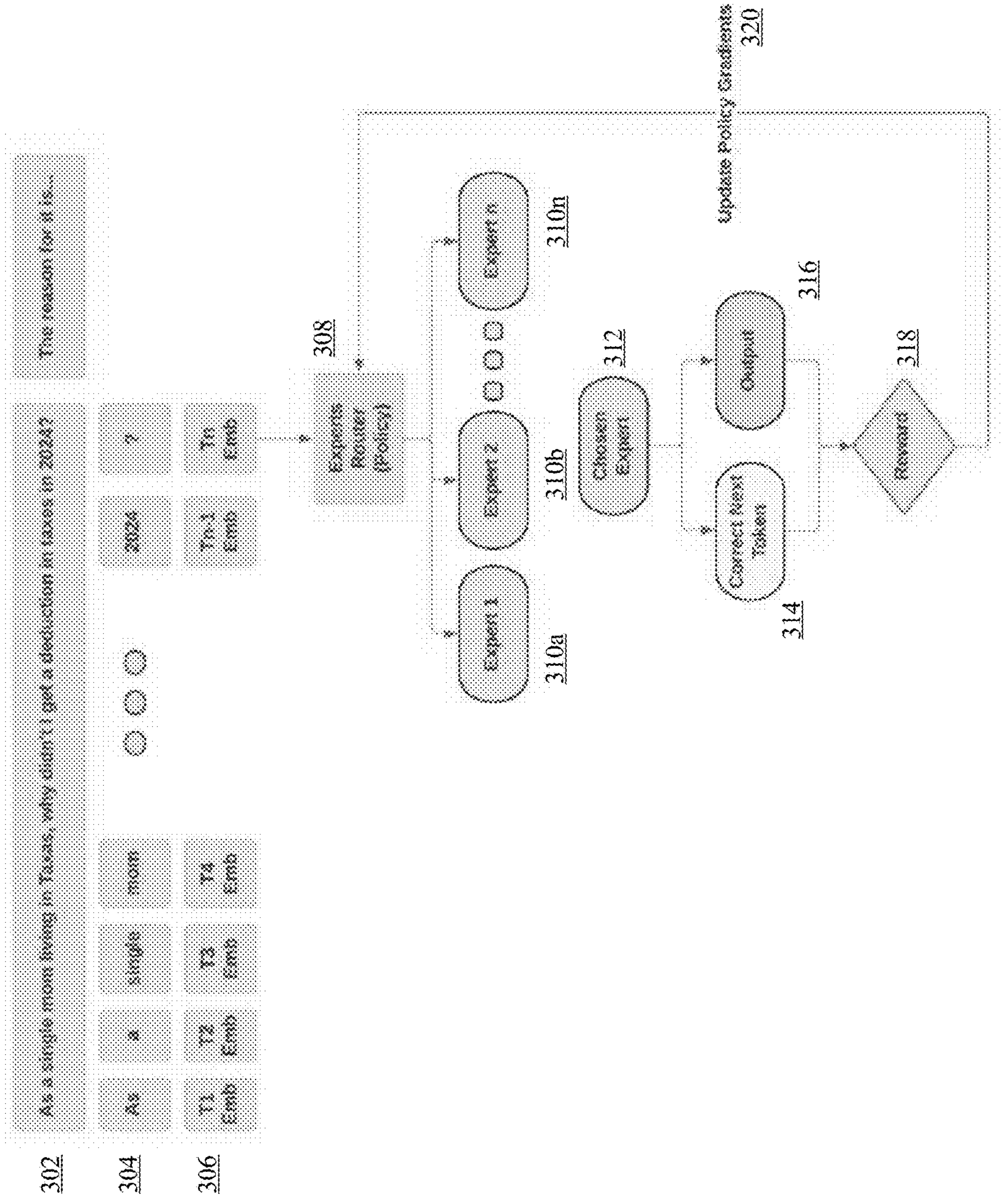
FIG. 3 shows a functional flow diagram of a method of training and/or deploying a gating network, based on the principles disclosed herein.

FIG. 3 shows a functional flow diagram of a method 300 of training and/or deploying a gating network, based on the principles disclosed herein. The gating network may also be referred to as an experts router (e.g., an experts router 308). It should be understood that the steps or components of the functional flow diagram are examples and therefore should not be considered limiting. That is, methods with alternative, additional, or fewer number of steps and/or components should be considered within the scope of this disclosure. As shown, the functional flow diagram is used for a language model (e.g., to predict a next token), but can be generalized to any kind of artificial intelligence model.

As shown, an experts router 308 may receive token embedding 306 generated from individual word tokens 304 of a sentence 302 (e.g., as shown "As a single mom living in Texas, why didn't I get a deduction in taxes in 2024?"). The experts router 308 may use a policy to select one or more of the experts 310*a*, 310*b*, . . . , 310*n* within the shown mixture of experts. As shown, an expert 312 is chosen to generate an output 316 with predicted next token for the large language model. The output 316 is then compared to the correct next token 314 (i.e., the ground truth). Based on the comparison between the output 316 and the correct next token 314, a reward 318 may be calculated. The reward 318 may be positive when there is a match (or a desired degree of overlap) between the output 316 and the correct next token 314. The reward 318 may be negative when there is no match between the output and the correct next token 314. Based on the reward 318, a policy update gradient update 320 may be permed to update the routing policy of the experts router 308.

Figure 4:
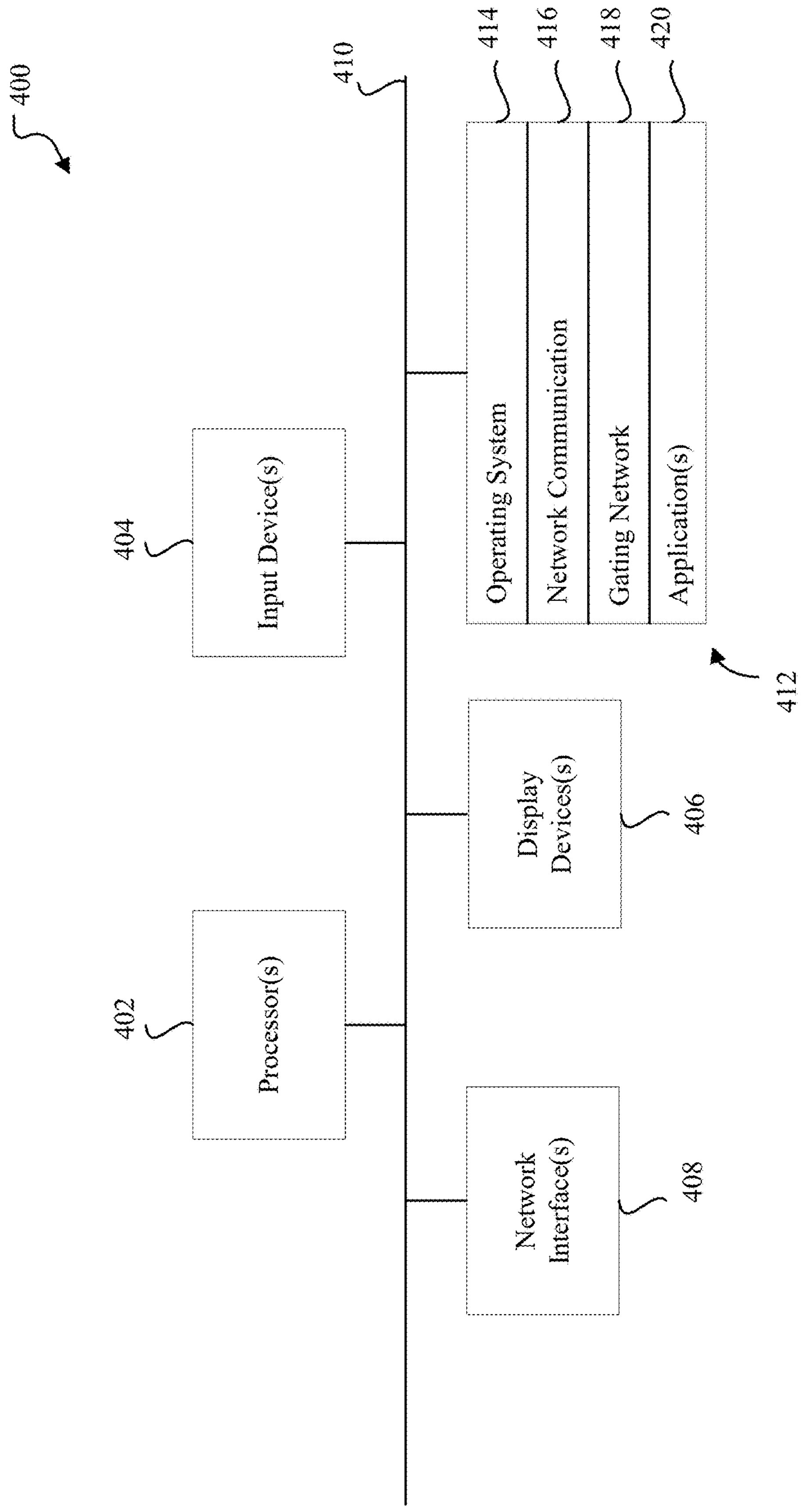
FIG. 4 shows a block diagram of an example computing device that implements various features and processes based on the principles disclosed herein.

FIG. 4 shows a block diagram of an example computing device 400 that implements various features and processes based on the principles disclosed herein. For example, computing device 400 may function as first server 120, second server 130, client 150*a*, client 150*b*, or a portion or combination thereof in some embodiments. The computing device 400 may perform one or more steps of the methods 200,300. The computing device 400 is implemented on any electronic device that runs software applications derived from compiled instructions, including without limitation personal computers, servers, smart phones, media players, electronic tablets, game consoles, email devices, etc. In one or more embodiments, the computing device 400 includes one or more processors 402, one or more input devices 404, one or more display devices 406, one or more network interfaces 408, and one or more computer-readable media 412. Each of these components may be coupled by a bus 410.

Display device 406 includes any display technology, including but not limited to display devices using Liquid Crystal Display (LCD) or Light Emitting Diode (LED) technology. Processor(s) 402 uses any processor technology, including but not limited to graphics processors and multi-core processors. Input device 404 includes any known input device technology, including but not limited to a keyboard (including a virtual keyboard), mouse, track ball, and touch-sensitive pad or display. Bus 410 includes any internal or external bus technology, including but not limited to ISA, EISA, PCI, PCI Express, USB, Serial ATA or FireWire. Computer-readable medium 412 includes any non-transitory computer readable medium that provides instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 412 includes various instructions 414 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 404; sending output to display device 406; keeping track of files and directories on computer-readable medium 412; controlling peripheral devices (e.g., disk drives, printers, etc.) which can be controlled directly or through an I/O controller; and managing traffic on bus 410. Network communications instructions 416 establish and maintain network connections (e.g., software for implementing communication protocols, such as TCP/IP, HTTP, Ethernet, telephony, etc.).

Gating network 418 includes instructions for the routing function for mixture of experts that may be trained and deployed using the principes described throughout this disclosure.

Application(s) 420 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method for using a mixture of experts network to predict a next token for a large language model, the method comprising:

receiving a token for which the next token is to be predicted by the mixture of experts network;

selecting, by a gating network, a subset of experts in the mixture of experts network to process the token, the subset of experts having corresponding weights, and the gating network and the experts being trained using a hybrid approach by:

inputting a training token to the gating network;

selecting, by the gating network, one or more experts within the mixture of experts network for processing the training token;

combining outputs from the one or more experts to generate a final output of the mixture of experts network;

calculating a reward for the gating network using a difference between the final output and a corresponding correct output;

updating a policy gradient of a routing policy of the gating network based on the reward and using reinforcement learning; and in parallel to updating the policy gradient of the routing policy of the gating network, updating the mixture of experts using backpropagation;

generating, by the subset of experts, corresponding intermediate outputs; and predicting the next token based on the intermediate outputs and the corresponding weights.

2. The computer-implemented method of claim 1, further comprising:

further training the gating network using a difference between the next token and a correct corresponding correct next token.

3. The computer-implemented method of claim 1, the updating of the policy gradient comprising:

updating the policy gradient using at least one of proximal policy optimization, advantage actor critic, trust region policy optimization, soft actor critic, or a bandit approach.

4. The computer-implemented method of claim 1, the selecting of the one or more experts comprising:

selecting, by the gating network, the one or more experts using a routing policy of the gating network, the routing policy defining a selection of experts for an attribute of the training token.

5. The computer-implemented method of claim 1, the selecting of the one or more experts comprising:

selecting, by the gating network, a subset of top-k experts as the one or more experts using a stochastic top-k mechanism.

6. The computer-implemented method of claim 1, the combining of the outputs from the one or more experts to generate the final output comprising:

calculating a weighted sum of the output as the final output using weights provided by the gating network.

7. The computer-implemented method of claim 1, the calculating of the reward for the gating network comprising:

generating a positive reward for a desired selection of the one or more experts.

8. The computer-implemented method of claim 1, the calculating of the reward for the gating network comprising:

generating a negative reward for a non-desired selection of the one or more experts.

9. The computer-implemented method of claim 1, the calculating of the reward for the gating network comprising:

calculating the reward as a negative of cross entropy between the final output and the corresponding correct output.

10. A system comprising:

a non-transitory storage medium storing computer program instructions; and one or more processors configured to execute the computer program instructions to cause operations comprising:

receiving a token for which a next token is to be predicted by a mixture of experts network;

selecting, by a gating network executed by the one or more processors, a subset of experts in the mixture of experts network to process the token, the subsets of experts having corresponding weights, and the gating network and the experts being trained using a hybrid approach by:

inputting a training token to the gating network;

selecting, by the gating network, one or more experts within the mixture of experts network for processing the training token;

combining outputs from the one or more experts to generate a final output of the mixture of experts network;

calculating a reward for the gating network using a difference between the final output and a corresponding correct output;

updating a policy gradient of a routing policy of the gating network based on the reward and using reinforcement learning; and in parallel to updating the policy gradient of the routing policy of the gating network, updating the mixture of experts using backpropagation;

generating, by the subset of experts, corresponding intermediate outputs; and predicting the next token based on the intermediate outputs and the corresponding weights.

11. The system of claim 10, the operations further comprising:

further training the gating network using a difference between the next token and a corresponding correct next token.

12. The system of claim 10, the updating of the policy gradient comprising:

updating the policy gradient using at least one of proximal policy optimization, advantage actor critic, trust region policy optimization, soft actor critic, or a bandit approach.

13. The system of claim 10, the selecting of the one or more experts comprising:

selecting, by the gating network, the one or more experts using a routing policy of the gating network, the routing policy defining a selection of experts for an attribute of the training token.

14. The system of claim 10, the selecting of the one or more experts comprising:

selecting, by the gating network, a subset of top-k experts as the one or more experts using a stochastic top-k mechanism.

15. The system of claim 10, the combining of the outputs from the one or more experts to generate the final output comprising:

calculating a weighted sum of the output as the final output using weights provided by the gating network.

16. The system of claim 10, the calculating of the reward for the gating network comprising:

generating a positive reward for a desired selection of the one or more experts.

17. The system of claim 10, the calculating of the reward for the gating network comprising:

generating a negative reward for a non-desired selection of the one or more experts.

18. The system of claim 10, the calculating of the reward for the gating network comprising:

calculating the reward as a negative of cross entropy between the final output and the corresponding correct output.

* * * * *